2,906,721

METHOD FOR PREPARING TETRAHYDROFURAN LACQUER OF WET VINYLIDENE CHLORIDE-ACRYLONITRILE COPOLYMER

Herbert Malin, Pawtucket, R.I., and Herbert C. Roehrs, Beaverton, Mich., assignors to The Dow Chemical Company, Midland, Mich., a corporation of Delaware No Drawing. Application September 28, 1956
Serial No. 612,889

4 Claims. (Cl. 260—29.6)

This invention relates to improved lacquer compositions. More particularly it relates to such compositions based upon certain normally crystalline vinylidene chloride polymers.

The normally crystalline vinylidene chloride polymers are those composed predominantly of vinylidene chloride and having relatively small but significant amounts of another monoethylenically unsaturated monomer, such as vinyl chloride, vinyl acetate, and acrylonitrile, copolymerized therewith. One of the outstanding properties of those copolymers is impermeability to moisture vapor transmission when fabricated into films and coatings. Another characteristic property is insolubility in almost all organic solvents. A still further characteristic is the close proximity of the softening points to the temperatures at which severe degradation occurs. Because of their low moisture vapor transmission as well as their clarity and other properties the copolymers of vinylidene chloride and acrylonitrile are highly useful coating materials for other more permeable films such as cellophane. However, considerable difficulty has been encountered in applying the copolymers as a film to the desired substratum. The proximity of their softening and decomposition temperatures precludes melt coating, extrusion, or thermal lamination. Latexes of such copolymers have extremely short storage stability. Casting a lacquer of the copolymer on the substratum has been most promising. However, the lack of suitable solvents has made it necessary to resort to certain co-solvents, such as methyl ethyl ketone and toluene. Such co-solvents require that the polymer, which is usually made in an aqueous medium, be dried to free it completely from water if haze free coatings are to be obtained. Drying is a costly operation and decreases the thermal life of the copolymers. In addition even those co-solvents had but limited solubility for the copolymers so that fairly concentrated clear solutions were very difficult to achieve and necessitated dissolution and casting at elevated temperatures.

In view of the above difficulties it is the principal object of this invention to provide an improved lacquer composition based on the normally crystalline copolymers of vinylidene chloride and acrylonitrile.

It is a further object to provide such a composition which may employ undried copolymers.

It is a still further object to provide such a lacquer composition which may be prepared, stored, and cast at relatively low temperatures.

It has now been found that lacquers may be prepared comprising from 5 to 25 percent by weight of a normally crystalline copolymer of vinylidene chloride and acrylonitrile containing up to 35 percent by weight based on the weight of said copolymer of water and correspondingly from 95 to 75 percent by weight of the solution of tetrahydrofuran.

Any of the normally crystalline vinylidene chloride-acrylonitrile copolymers may be employed in the compositions. Increased impermeability to moisture vapor and improvement in other coating properties are attained with increased vinylidene chloride content with optimum results being attained when the copolymer is composed of from 85 to 95 percent by weight of vinylidene chloride together with from 15 to 5 percent by weight of acrylonitrile. Those polymers are accordingly preferred in these lacquer compositions. While in the prior known solvent systems for the vinylidene chlorideacrylonitrile copolymer lacquers, the range of chemical composition of the copolymer greatly influenced the solubility of the copolymer, that is not true in the present lacquer compositions. It is known that during polymerization of vinylidene chloride and acrylonitrile, the composition of the copolymer formed varies with the degree of conversion of monomers to copolymer. Thus some of the copolymer chains will contain more vinylidene chloride and some less than the ratio at which the monomers were charged into the system. The prior known lacquer solvents would not dissolve those copolymer chains containing less than about 10 percent acrylonitrile and any lacquers produced with such chains were hazy and not useful for coating clear substrata.

The polymers may be prepared by any of the conventional polymerization techniques, although those copolymers prepared by emulsion polymerization methods are generally of higher molecular weight and consequently can form films which are stronger and have increased tear strength. Those copolymers are isolated by coagulation and should be washed until substantially all of the emulsifier and coagulant are removed prior to preparing the lacquers. The copolymers need not be dried, however, and must only be dewatered to contain about 35 percent by weight water or less. When more than about 35 percent water is present the resultant lacquers are hazy and unsuitable for coating transparent substrata. Dewatering to 35 percent water and even to about 5 percent water is easily accomplished in conventional basket centrifuges or similar equipment. To reduce the water below 5 percent requires thermal drying.

The lacquers are easily prepared by simply intermixing the wet polymer and tetrahydrofuran with agitation. Although slightly elevated temperatures may be used in the preparation to hasten dissolution, such temperatures are not required.

If desired for economic or other reasons up to about 25 percent by weight of the tetrahydrofuran may be replaced with another organic solvent miscible with the tetrahydrofuran. Typical examples of such solvents are acetone and toluene. When more than 25 percent of the tetrahydrofuran is replaced by the co-solvent, the difficulties of low temperature dissolution, storage, and casting appear as well as haze, gelation and other problems.

The lacquers prepared in accordance with this invention are clear initially and may be stored for short periods of time of up to several days without gelation or loss of clarity. The lacquers find use as coatings for substrata such as cellophane. The coatings because of their clarity do not affect the transparency of uncolored cellophanes and enhance the color of colored cellophane.

The substrata may be coated with the lacquers of this invention by any conventional means. Exemplary of those methods is that where the lacquer is cast and doctored onto the substratum and the solvent volatilized by air drying, heated forced air, or by exposure to infra red heating.

By way of example several lacquers were prepared by dissolving 15 percent by weight of a wet copolymer composed of 90 percent by weight of vinylidene chloride and 10 percent by weight of acrylonitrile and containing 25 percent of the weight of wet polymer of water into various solvents. One of the lacquers contained 85 percent tetrahydrofuran, one contained 63.8 percent by weight tetrahydrofuran and 21.2 percent by weight of acetone, and the third contained 63.8 percent tetrahydrofuran and 21.2 percent by weight of toluene. Each of the lacquers was cast on cellophane at room temperature and dried to a 0.001 inch dry coating. The resulting coated cellophane was completely clear and impervious to moisture vapor.

By way of contrast a similar coating was prepared by dissolving the same proportion of the same copolymer in a co-solvent to form a solution containing 55.2 percent by weight of methyl ethyl ketone and 29.8 percent by weight of toluene. It was found to be necessary to warm the mixture to about 70° C. to attain complete dissolution and even then the solution was hazy. Upon cooling the solutions gelled to where they were too viscous for casting. When the lacquers were cast from a hot solution onto cellophane and dried, the resulting coated cellophane was hazy and commercially useless.

We claim:

1. The method of preparing a lacquer of a normally crystalline copolymer of vinylidene chloride and acrylonitrile consisting of dissolving in a solvent from 5 to 25 percent by weight of a wet copolymer composed of from about 85 to 95 percent by weight of vinylidene chloride and a complementary amount of from about 15 to 5 percent by weight of acrylonitrile, said wet copolymer containing intermixed therein from about 5 to about 35 percent by weight of water, said solvent consisting of at least 75 percent by weight of tetrahydrofuran with any remainder being an organic solvent miscible with tetrahydrofuran.

2. The method claimed in claim 1, wherein said solvent consists solely of tetrahydrofuran.

3. The method claimed in claim 1, wherein said organic solvent miscible with tetrahydrofuran is acetone.

4. The method claimed in claim 1, wherein said organic solvent miscible with tetrahydrofuran is toluene.

References Cited in the file of this patent

UNITED STATES PATENTS

| | | |
|---|---|---|
| 2,255,229 | Reppe et al. | Sept. 9, 1941 |
| 2,491,023 | Alles et al. | Dec. 13, 1949 |
| 2,545,317 | Stuchlik | Mar. 13, 1951 |
| 2,606,894 | Pitzl | Aug. 12, 1952 |
| 2,616,868 | Heisenberg et al. | Nov. 4, 1952 |
| 2,802,801 | Reid et al. | Aug. 13, 1957 |